June 11, 1957 R. K. LOCKHART 2,795,643

CROSSTALK REDUCTION SYSTEM FOR COLOR RECEIVERS

Filed Dec. 31, 1952 3 Sheets-Sheet 1

INVENTOR.
Robert K. Lockhart
BY [signature]
ATTORNEY

INVENTOR.
Robert K. Lockhart
BY [signature]
ATTORNEY

CROSSTALK REDUCTION SYSTEM FOR COLOR RECEIVERS

Filed Dec. 31, 1952 3 Sheets-Sheet 3

INVENTOR.
Robert K. Lockhart
BY Olin J. Mitchell
ATTORNEY

United States Patent Office 2,795,643

Patented June 11, 1957

2,795,643

CROSSTALK REDUCTION SYSTEM FOR COLOR RECEIVERS

Robert K. Lockhart, Moorestown, N. J., assignor to Radio Corporation of America, a corporation of Delaware Application December 31, 1952, Serial No. 328,957

6 Claims. (Cl. 178—5.4)

The present invention relates to methods and apparatus for substantially reducing crosstalk between two signals that are represented at least in part by the phase of a single carrier.

For example, in one color television system such a carrier may be generated in the following manner. A first alternating current wave having a predetermined phase is amplitude modulated in accordance with the amplitude variations of a first color signal and a second alternating current wave that is in phase quadrature with the first wave is amplitude modulated in accordance with the variations of a second color signal. These color signals may represent pure colors or combinations of colors. The amplitude modulated waves are then added in linear fashion so as to produce a single resultant color carrier having the same frequency as the first and second alternating current waves. The phase of the color carrier may vary through 360° if balanced modulation or other known modulation techniques are used and its phase will depend on the relative amplitudes and polarities of the first and second alternating current waves or in other words the phase depends on the relative value of the color signals and hue represented by these waves.

The frequency of the alternating current waves and hence the frequency of the color carrier is generally so chosen as to be located near the upper end of the video pass band of the system. In order to recover the first color signal at a receiver the color carrier is heterodyned with a third alternating current wave corresponding in phase to the first alternating current wave. The second color signal is recovered by heterodyning the carrier with a fourth alternating current wave corresponding in phase to the second alternating current wave. These third and fourth alternating current waves would, therefore, also be in phase quadrature.

In this system the frequency response characteristic of the receiver generally has a substantially linear slope at the high frequency end such that the color carrier falls at a 50% amplitude response point. This means that the upper sidebands of the color carrier are recovered with less amplitude than the lower sidebands. For reasons which will become more apparent in the discussion to follow, this produces crosstalk between the color signals that appears as positive or negative pulses, depending on the particular sequence of hues along a line of the raster. The presence of these pulses therefore causes some areas of transition from one hue to another to be darker than they should be and other areas of transition to be lighter. If a particular hue transition is reversed, that is instead of going red to blue the sequence of colors is from blue to red, the polarity of the pulses in the area of hue transition is reversed.

A detailed analysis of the sidebands of the color carrier is extremely complex and therefore their precise nature is not easily explained. The information carried by the frequencies of the upper sideband that extend beyond the cutoff point of the receiver frequency response characteristic is lost. If the color sequences along a line are reversed, then the information formerly carried by the upper sideband is carried by the lower sideband. If as proposed in the U. S. patent application for a color phase alternation system bearing Serial No. 220,622 filed on April 12, 1951, in the names of G. C. Sziklai et al., entitled "Multiplex Signaling System," the phase of one of the waves modulated by a color signal at the transmitter is shifted by 180°, the phase shift of the carrier is reversed for a given hue sequence and the information carried by the upper and lower sidebands is interchanged. Hence two scans of a given line can place all the desired information in the lower sideband of the carrier so that the average of the two scansions represents all of the information that resided in both sidebands before the upper sideband was cut off at the receiver. This reversal in phase can be chosen to occur at various rates with particular advantages, but generally the phase reversal takes place at field rate. Thus the average of points in adjacent lines of the raster that are in vertical registry corresponds to all the information in both sidebands. The phase reversal of one of the waves that are modulated at the transmitter and the consequent reversal of the direction of the phase shift of the color carrier for a given sequence of hues causes the crosstalk pulses that appear at an area of hue transition to reverse in polarity. Therefore, at areas of hue transition that are in vertical registry on adjacent lines, the crosstalk pulses have opposite polarities. As long as the eye sees the average of the light intensities produced in response to this crosstalk pulses, their presence is not harmful. However, there is a full field interval between the occurrence of the light impulses produced by a kinescope in response to these pulses, and under some conditions the eye does not average them but responds to the increase of light due to one of them, and after this has faded it responds to the decrease in light due to the other. This means that areas of hue transition that are in vertical registry on adjacent lines may appear to flicker.

If each of the colors were transmitted with signals of equal amplitude ranges, and if the decay time of the phosphors employed in the kinescope were identical, then because the eye is more sensitive to green than it is to red and more sensitive to red than it is to blue the flicker on green edges would be more noticeable than it is on red edges and the flicker on red edges would be more noticeable than it is on blue edges. However, if the amplitude ranges of the color signals were inversely proportional to the eye's sensitivity to the colors represented by these signals, then the amount of flicker seen by the eye would be the same for all colors. At the present time however the decay time for suitable red and green phosphors is greater than the decay time for a suitable blue phosphor so that flicker is first noticeable on blue edges. If the decay time of the blue phosphors were increased, the eye would not have to retain the image for as long a time and the flicker would probably be less noticeable.

It should be understood that the invention is not restricted to use in color systems in which the phases assigned to the different color signals are in quadrature, but is also applicable to color systems in which the phases assigned to the different color signals are not in quadrature. For example, in some systems the color signals are separated by 120°.

It is a primary object of this invention to substantially eliminate the undesirable effects of crosstalk between color signals, such substantial elimination serving to reduce the amount of edge flicker in a color system using color phase alternation and to eliminate dark and light edges when color phase alternation is not used, In accordance with the principles of the present invention, the aforesaid objectives are attained by effecting a cross feed from a first color channel a second color channel to a signal that is substantially equal but opposite in phase to the crosstalk signals present in the second channel so as to substantially cancel the crosstalk present therein. In accordance with embodiments of the present invention, such a signal is derived by differentiating the output of the first channel.

The specific manner in which this objective can be attained in accordance with the principles of this invention will be better understood after a detailed discussion of the drawings in which.

Figures 1, 1A:
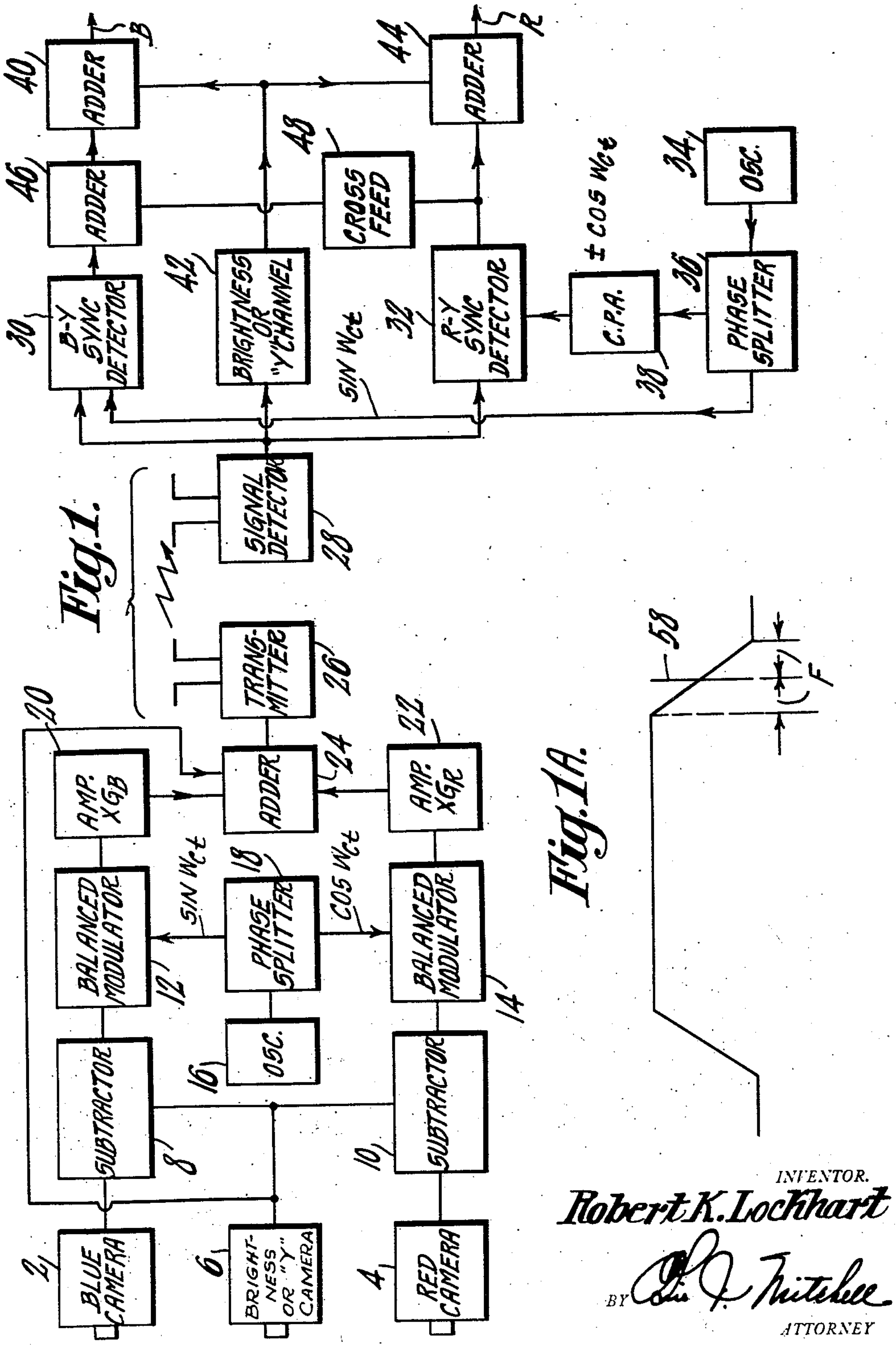
Figure 1 is a block diagram illustrating the manner in which the present invention can be incorporated in one version of the type of color television system set forth above.
Figure 1A illustrates the location of the color carrier with respect to the frequency response characteristic of the receiver of Figure 1.

In the color transmission system of Figure 1 the blue video signals are generated by a camera 2, the red video signals by a camera 4 and the brightness or Y signals by a camera 6. A subtractor 8 serves to subtract the brightness or Y signal from the blue video signal so as to yield a blue color difference signal B–Y. In a similar manner a subtractor 10 derives a red color difference signal R–Y. These color difference signals are a specific form of color signal used in the color system of Figure 1 in which the present invention may operate. It will be understood that other types of color signals could also be employed. The blue color difference signal is applied to a balanced modulator 12 so as to modulate a sine wave in such a manner that the phase of the wave is 0° for a positive B–Y signal and 180° for a negative B–Y signal. The red color difference signal is applied to a balanced modulator 14 so as to modulate a cosine wave in such manner that the phase of the wave is 90° for a positive R–Y signal and 270° for a negative R–Y signal during one field. If the system is to employ the color phase alternation principle discussed above, then the phase of the cosine wave is changed by 180° on the next field so that a positive R–Y signal produces a wave of 270° phase and a negative R–Y signal produces a wave of 90°. The sine and cosine waves are supplied by an oscillator 16 and a phase splitter 18. After being suitably amplified in amplifiers 20 and 22 the outputs of the modulators are combined with the output of the brightness camera in an adder 24 so as to form a composite signal that is transmitted in any suitable manner by a transmitter 26. The outputs of the modulators combine to produce a color carrier that is phase modulated with respect to hue and amplitude modulated with respect to the degree of color saturation. This carrier is the same frequency as the sine and cosine waves applied to the modulators and is combined with the brightness signal.

At the receiver the composite signal is recovered by any suitable signal detector 28 having a frequency response characteristic as indicated in Figure 1A and is applied to a synchronous detector 30 wherein it is heterodyned with a sine wave of zero degrees phase having the same frequency as the sine wave applied to the modulator 12 at the transmitter. It is well known that if an amplitude modulated wave is heterodyned with an unmodulated wave of the same frequency and phase (i. e. either in-phase or 180° out-of-phase) that the amplitude modulations are recovered. The composite signal appearing at the output of the signal detector 28 is also applied to a synchronous detector 32 where it is heterodyned with a cosine wave having the same frequency and phase as the cosine wave applied to the modulator 14 at the transmitter. If the color phase alternation principle is employed, the phase of the cosine wave applied to the synchronous detector 32 changes from 90° to 270° on successive fields so as to be synchronized with the cosine wave applied to the modulator 14 at the transmitter. The sine and cosine waves are derived from an oscillator 34 by a phase splitter 36 and the phase reversal of the cosine wave for purpose of color phase alternation are brought about by a color phase alternation switching circuit 38. The B–Y signal appearing at the output of the synchronous detector 30 is combined in an adder 40 with the composite signal after the latter has emerged from a brightness channel 42 and the Y components cancel each other so as to produce a blue video signal B. The red video signal R is similarly recovered by combining the R–Y and the brightness signals in an adder 44.

Figures 2, 3, 4:
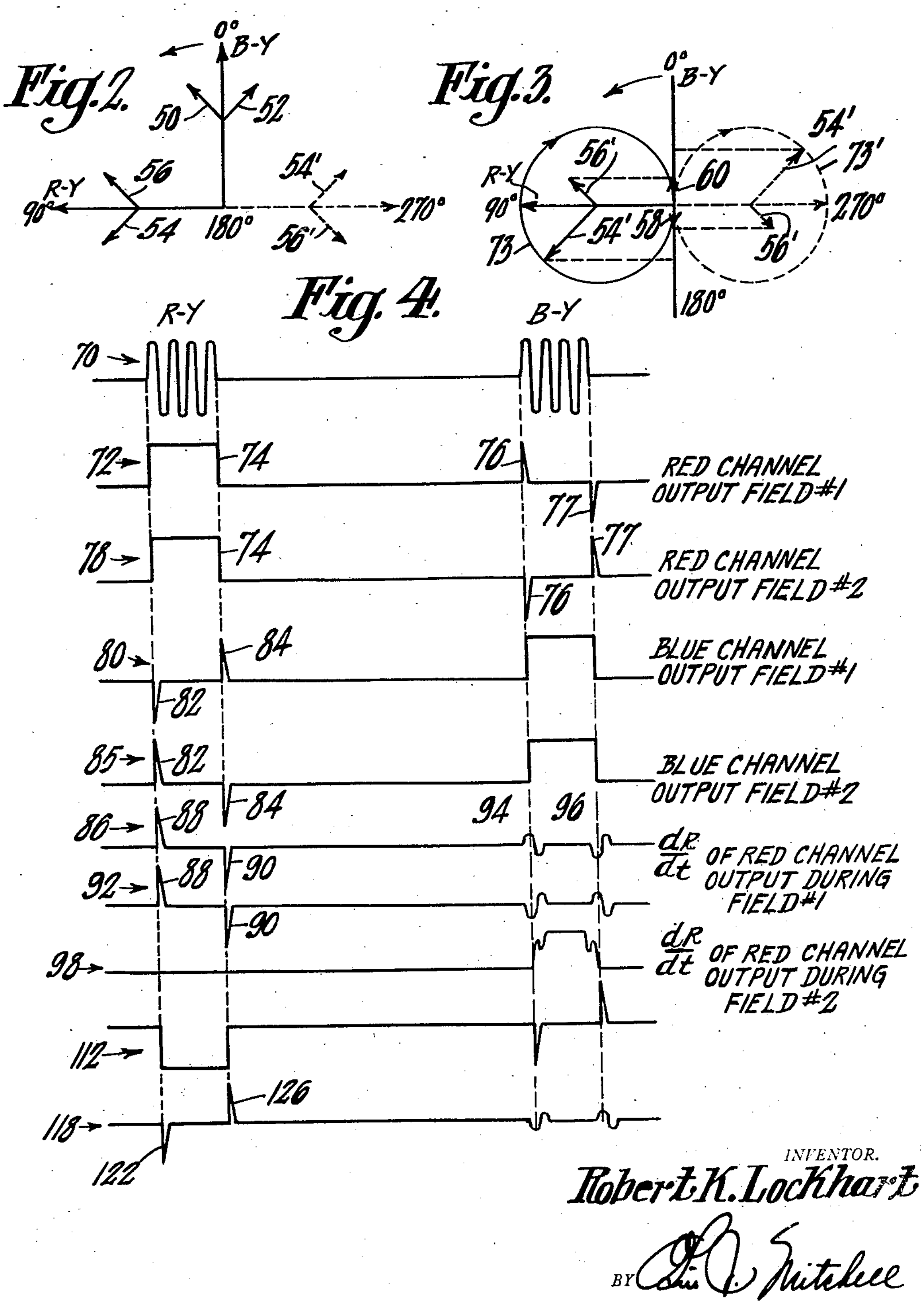
Figures 2 and 3 are vector diagrams used in explaining the origin of the crosstalk to be eliminated by the present invention.
Figure 4 is a series of graphs used in explaining the operation of the invention.

Thus far the color transmission system corresponds to that described in an article entitled "Principles of NTSC compatible color television," appearing at page 88 in Electronics for February 1952. In accordance with this invention the B–Y signal is combined in an adder 46 with a crosstalk elimination signal supplied by a cross feeding circuit 48. The following discussion will show how the system operates without the crossfeeding circuit in order that the nature of the crosstalk in the original system may be more clearly understood and the manner in which the cross feeding circuit must operate to eliminate the crosstalk may be more apparent. If the color carrier is located in a flat region of the frequency response characteristic of the receiver it may be represented by a vector diagram of Figure 2. It will be remembered that the color carrier was obtained by combining signals derived by amplitude modulating a sine wave with the blue color difference signal B–Y and by modulating a cosine wave with the red color difference signal R–Y. The vectors B–Y and R–Y of Figure 2 illustrate the sine and cosine waves and as amplitude modulation produces two sidebands, the B–Y and R–Y vectors may be thought of as being the resultant of the sideband vectors 50, 52, 54 and 56 respectively. If color phase alternation is employed, the R–Y vector and its sidebands will be shifted by 180° so as to assume the dotted position on every other field. In recovering the B–Y signal, the color carrier is heterodyned with an unmodulated sine wave and in accordance with well established principles yields a signal that is the resultant of projections of all the vectors on the zero degree axis. The projections of the equal upper and lower R–Y sidebands vectors 54 and 56 cancel each other during either field as one is positive and the other is negative.

Now if instead of being located in a flat region of the frequency response characteristic of the signal detector 28, the color carrier is located in the middle of a sloping region such as indicated by the line 58 of Figure 1A, it will be seen that the upper sideband frequencies have less amplitude than the lower sideband frequencies, as indicated by the vector diagram of Figure 3. During the field represented by the solid lines the resultant of the projection of the R–Y sideband vectors 54′ and 56′ is a vector 58 that is at 180°. During the next field, the one represented by the dotted vectors, the resultant of the projections of the upper and lower sideband vectors 54′ and 56′ is a vector 60 equal in length to the vector 58 and having a zero degree phase. This means that the average effect of the crosstalk from the R–Y into the B–Y channel is zero for points on adjacent lines of the line interlaced raster that lie in vertical registry. If the eye responds to this average, then the crosstalk is of little or no effect, but if it doesn't, the effect of the crosstalk will be a flicker at picture (30 C. P. S.) repetition rate.

The discussion above has been confined to the situation where the hue and hence the phase of the carrier remained constant and the intensity of the hue varied. Under these conditions both upper and lower sidebands are simultaneously present for frequencies not greater than F (see Figure 1A) and only one sideband is present for frequencies greater than F.

The precise operation of the system for changes of hue that are represented by changes in the phase of the color carrier is much more involved. Suffice it to say that a given color sequence along a scanned line of the raster may advance the phase of the carrier and produce dissimilar upper and lower sidebands. Part of the information about the change in hue, therefore, lies in one sideband and another part of the information lies in the other. However, those upper sideband frequencies greater than F are cut off by the signal detector 28 of Figure 1. If the order in which the various colors are represented by successive phases of the color carrier is reversed, then the information formerly represented by the upper sideband is now represented by the lower sideband. This means that information as to the hue change that resided in the original upper sideband and which was cut off by the signal detector can be represented by a lower sideband if the order of the colors represented by a given phase rotation of the carrier is reversed.

Whether color phase alternation is used or not, the fact still remains that the upper sideband frequencies have less and less amplitude as they deviate farther and farther from the frequency of the color carrier until they reach a frequency F at which frequency they have a zero amplitude. This means that the projection on the B–Y axis of the vector representing the upper sideband frequencies of the R–Y signal is not equal to a similar projection of the vector representing the lower sideband frequencies, as their amplitude gets larger and larger with frequency deviation from the carrier. This is true even if the lower sideband frequencies are also limited to a frequency deviation from the carrier of F cycles. That dissimilar projections of sideband vectors introduce crosstalk into the B–Y channel as a result of changes in the R–Y signal has been amply explained in connection with the vector diagram of Figure 3. The crosstalk for frequencies below F is therefore generally proportional to frequency.

The particular kind of crosstalk introduced from one channel to another may be better understood from the graphs of Figure 4 which represent the various signals involved along one line of the raster when the object being televised is comprised of vertical red and blue bars that are separated by a gray, black or white area. During the scansion of the red bar, the R–Y signal may modulate a wave of 90° phase, and during the scansion of the blue bar, the B–Y signal modulates a wave of 0° phase as indicated by the graph 70 of Figure 4. A graph 72 of Figure 4 indicates that during the red bar the R–Y synchronous detector 32 recovers the R–Y signal 74 representing the red bar. The blue bar produces positive and negative spikes 76 and 77 at its beginning and end respectively. Thus, the left side of the blue bar at this particular line in the raster would appear brighter and the right hand side would appear darker. These spikes appear because of the inequality of the amplitudes of the upper and lower sidebands of the B–Y signal produced as a result of the shape of the frequency characteristic (Figure 1A) of the signal detector 28. This unequal projection on the R–Y axis produces a resultant that is detected by the R–Y detector. If the B–Y frequency were limited to F cycles so that the B–Y signals lay wholly within the double sideband region of operation the spikes would have an amplitude that is proportional to the frequencies involved in the B–Y signal and would by definition be a first derivative of the B–Y signal. Actually, however, the B–Y signal would normally contain frequencies greater than F that lie in the single sideband region and their projection on the R–Y axis does not change with frequency. Therefore, the spikes are not pure derivatives of the B–Y signal but may be approximated by the first derivative.

Graph 78 indicates the effects of color phase alternation on the signal recovered by the R–Y synchronous detector 32 during the next field and therefore on a different line of the raster. The alternating current wave modulated by the R–Y signal at the transmitter is now 180° from its position in the previous field and therefore is 180° away from the position occupied during the line of the raster illustrated by the graph 72. The phase of the aternating current wave applied to the R–Y synchronous detector 32 is now also shifted 180° away from its phase during the previous field by the color phase alternation circuit 38 so that the R–Y signal representing the red bar is recovered with the same polarity. However, the alternating current wave supplied to the B–Y synchronous detector does not change in phase so that the polarity of the spikes 76 and 77 reverses.

Graph 80 indicates that successive negative and positive spikes 82 and 84 respectively are produced at the output of the B–Y synchronous detector 30 by the red bar, and the graph 85 shows that color phase alternation merely reverses the direction of the spikes during the next field. This latter reversal is explained in connection with Figure 3 where the spikes 82 and 84 are represented by the crosstalk vectors 58 and 60 respectively.

That the polarity of the spikes or pulses is as indicated in the graphs can be seen from the following analysis. Assume that the sideband frequencies deviate from the carrier frequency by a frequency F so that the amplitude of the upper sideband vectors 56' is zero, and therefore only the lower sideband vectors 54' need be considered. In going from a gray region to a maximum R–Y signal as indicated by the signal 74 of the graph 72, the solid vector 54' follows a locus 73 in the direction of the arrow so that its projection on the B–Y axis grows negative as indicated by the negative crosstalk pulse 82 of the graph 80. During the next field the dotted vector 54' follows a locus 73' in the direction of the arrow so as to produce a positive crosstalk pulse 82 shown in the graph 85. When the R–Y signal 74 goes back to zero, the solid and dotted vectors 54' retrace their loci in a direction opposite to the arrows so as to produce projections or crosstalk on the B–Y axis that have the polarities indicated by the pulses 84 in the graphs 80 and 85 respectively.

It has already been explained that the spikes in the R–Y channel, due to crosstalk from the B–Y signals, are not generally troublesome because of the comparatively long time constant of the red phosphors available. Therefore, the immediately following description will concern itself with application of the principles of the invention only to reducing the spikes appearing in the B–Y signal due to crosstalk from the R–Y signal. This crosstalk is illustrated by the spikes 82 and 84. Graph 86 illustrates the results produced by differentiating the output of the R–Y detector 32 during the first field and shows that spikes 88 and 90 are developed at the leading and trailing edges of the red bar so as to coincide respectively with the crosstalk spikes 82 and 84 appearing in the B–Y channel. The portions of the crosstalk spikes 82 and 84 that are comprised of frequencies in the double sideband region, or in other words contain frequencies that do not deviate by more than F cycles from the carrier, may be cancelled by adding either or both of the spikes 82 and 84 and either or both of the spikes 88 and 90 together with opposite polarities.

The particular circuits indicated by the block 48 of Figure 1 that I employ to develop the crosstalk elimination spikes 88 and 90 that are to be added to the output of the B–Y detector 30 by the adder 46 both operate from signals appearing at the output of the R–Y detector 32. If color phase alternation is not employed and if the phase of the R–Y signal is 90° as indicated by the solid lines of the vector diagrams of Figures 2 and 4, the polarities of the crosstalk spikes 82 and 84 is as indicated in the graph 80 of Figure 4 for all lines of the raster. The left hand or leading edge of the red bar will be darker than normal and that the right hand or trailing edge will be brighter than normal owing to the change in the amount of blue light at the edges of the red bars. This also produces a change in hue. A direct differentiation of the R–Y output yields crosstalk elimination spikes 88 and 90 which are opposite in polarity to the corresponding crosstalk spikes 82 and 84 of the graph 80. Hence, cancellation can be effected by adding the two sets of spikes. The R–Y signal is at 270° as indicated by the dotted vectors of Figures 2 and 3 and the crosstalk elimination spikes should be subtracted from or reversed in polarity and added to the output of the B–Y detector.

If, on the other hand, color phase alternation is employed, the crosstalk spikes 82 and 84 reverse in polarity during the next field as indicated by the spikes, 82 and 84 of graph 85. The crosstalk elimination spikes 88 and 90 that are derived during the field do not reverse in polarity as indicated by the graph 92 of Figure 4. Hence, during this field, the crosstalk spikes 82 and 84 have the same respective polarities as the corresponding crosstalk elimination spikes 88 and 90. Then means must be provided for reversing the polarities of the crosstalk elimination spikes before they are added to the crosstalk spikes in the adder 46. Alternatively, the crosstalk elimination spikes 88 and 90 could be subtracted from the crosstalk spikes 82 and 84, i. e. adder 46 could be altered to effect a subtraction.

An examination of the graph 86, which illustrates the signal resulting from the differentiation of the output of the R–Y detector 32, indicates that this signal includes waves 94 and 96. These waves are the derivatives of the blue crosstalk spikes 76 and 77 appearing in the R–Y channel. Since the spikes 76 and 77 result in part from an effective differentiation of the signal representing the blue bar by the R–Y detector 32, the waves 94 and 96 are essentially representative of the second derivative of the signal representing the blue bar. For this reason their relative amplitude is generally small so that their introduction into the B–Y channel produces very little distortion of the desired signal representing the blue bar. A graph 98 illustrates the B–Y signal output of adder 46, assuming that the R–Y signal and B–Y signal do not include frequencies that lie outside the double sideband region.

In the description above, the crosstalk elimination spikes are derived by differentiating the output of the R–Y detector and are added to the B–Y signal. Under some conditions, especially when red and green phosphors having a shorter decay time are used, it will be desirable to additionally derive crosstalk elimination spikes by differentiating the output of the B–Y detector, and to add them in a cancelling phase to the R–Y signal so as to eliminate the crosstalk spikes 76 and 77 that appear in the R–Y channel as a result of the blue bar signal. Although crossfeeding in this direction is not particularly shown, it will be appreciated that the operation and results thereof are comparable to the described crossfeeding in the opposite direction.

It should be pointed out that although the general arrangements described operate from the output of the R–Y or B–Y detectors, as the case may be, this is but one manner of deriving the crosstalk elimination spikes by a differentiation process and that other means for deriving similar signals could be used which would derive these spikes directly from the output of the signal detector 28, without extending beyond the scope of the generic concept of this invention. See for example the circuit described in the U. S. patent application of R. N. Rhodes bearing Serial No. 328,916, filed on December 31, 1952, now U. S. Patent Number 2,680,147, issued June 1, 1954.

A differentiated signal may be defined as a signal that is proportional to the frequency of the signal differentiated. It will be appreciated that there are a variety of known ways for performing the function of differentiation, and it should be understood that the present invention is not restricted to the use of the particular differentiating means shown in the schematic figures of the drawings to be subsequently described.

It has been stated that the crosstalk elimination spikes such as 88 and 90 may be derived by a differentiation process and that these spikes exactly cancel the portion of the crosstalk spikes, such as 82 and 84, that is derived from the frequencies of the blue bar signal lying within the double side band region. In general, the blue bar signals in the example given above, have frequency components that extend into the single sideband region and the contribution of these frequencies to the crosstalk spikes 82 and 84 is apparently not cancelled. However, in some situations, certain beneficial results may be obtained by permitting the differentiation network or its equivalent operate in the single sideband frequencies as well as the double sideband frequencies. Furthermore, the analysis of the sharp edges of the bar signals such as 74 indicates that the amplitude of the various frequency components decreases with frequency so that the crosstalk due to those frequencies lying in the single sideband region is relatively unimportant.

Figures 5, 6:
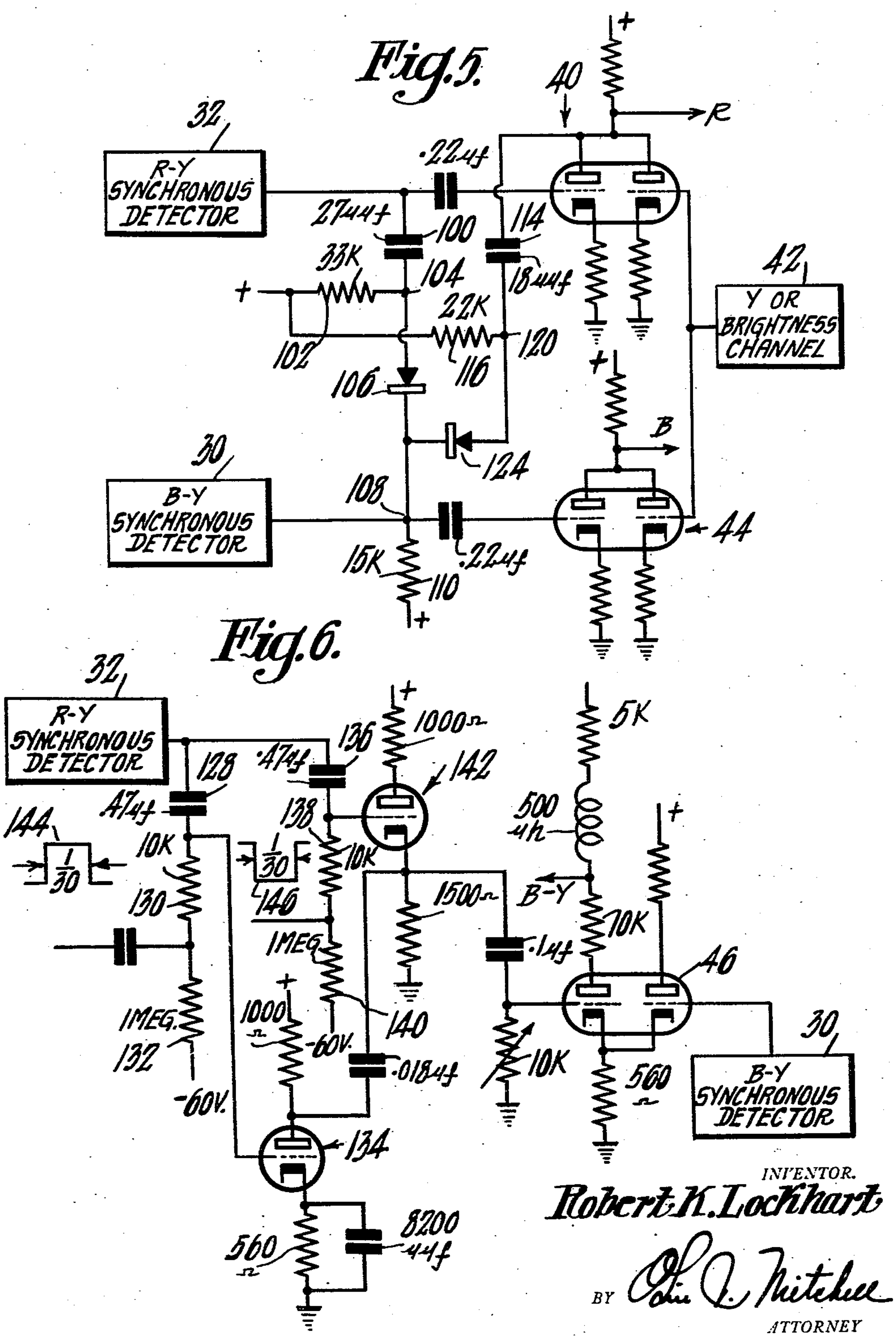
Figure 5 is a schematic diagram illustrating one way in which the principles of this invention may be applied to a receiver adapted to use in a color system employing color phase alternation. This particular circuit eliminates crosstalk of only one polarity.
Figure 6 is a schematic diagram illustrating another way of applying the principles of this invention to a receiver adapted for use in a color system employing color phase alternation. This particular circuit operates in such manner as to eliminate crosstalk of either polarity.

Figure 5 illustrates one crosstalk elimination circuit that operates in response to the output of the R–Y detector in such manner that only the positive crosstalk spikes are reduced or eliminated. Thus, during the first field, the crosstalk spike 84 is reduced and during the next field the crosstalk spike 82 is reduced. This particular circuit has the advantage that no switching circuits are involved. The fact that the negative crosstalk spikes, i. e. 82 on the first field and 84 on the second, are not eliminated is permissible because these negative spikes reduce the intensity of the edge and the greatest effect they can have is to reduce the intensity to zero so that the right hand edge of the black bar is outlined in black. The positive spikes on the other hand may increase the intensity of the left hand edge of the red bar a great deal and as the eye's sensitivity increases with the intensity of the light, these bright edges may considerably deteriorate the image.

In the circuit of Figure 5 the output of the R–Y detector 32 is differentiated by a series combination of a condenser 100 and a resistor 102 so that positive and negative crosstalk elimination spikes such as 88 and 90 respectively of graphs 86 and 92 appear at the junction 104 between the resistor and condenser during both the first and second fields. Only the negative spikes 90 are passed by a crystal 106 to a junction 108 between a resistor 110 and the output of the B–Y detector. The negative spikes 90, therefore, tend to cancel the positive crosstalk spikes 84 that are produced during the first field by the B–Y detector as indicated by the graph 80.

The output of the R–Y detector is coupled to the adder 40 which may be comprised of a double triode, one triode having its grid coupled so as to receive the R–Y signal and the other triode having its grid coupled to a positive Y signal from a brightness channel 42. The plates of the two triodes are coupled to B+ through a common plate impedance so that the R–Y and Y signals applied to their respective grids are added and yield a −R signal such as indicated by the graph 112 of Figure 4. If the color signal were such as not to require the adder 40, then the right hand triode of the adder 40 could be dispensed with and the left hand triode would merely function as a phase inverting device. This —R signal is differentiated by a condenser 114 and a resistor 116 so that a wave having spikes 122 and 126 such as illustrated by the graph 118 appears at their junction 120. The R and R–Y signals are generally similar so that the crosstalk elimination spikes may be derived by differentiating either one. A crystal 124 is connected between the latter junction and the junction 108 in such polarity that only the negative spike 22 reaches the junction 108. This negative spike occurs at the leading edge of the red bar 74 and therefore adds to the negative crosstalk spike 82 of graph 80 occurring at this time. Such accentuation of the negative crosstalk spikes in the blue channel are not necessarily harmful for reasons previously set forth. In conclusion then it can be said that during the first field the circuit of Figure 5 operates to reduce or cancel the positive crosstalk spikes 84 appearing in the blue channel at the trailing edge of the red bar and to accentuate the negative spikes appearing at the leading edge of the red bar.

During the second field the crosstalk elimination spikes 88 and 90 that are produced at the junction 104 are indicated by the graph 92 and it will be observed that they are identical to the spikes 88 and 90 appearing at the junction during the first field. As before only the negative spike 90 that occurs at the trailing edge of the red bar reaches the junction 108 wherein it adds in negative polarity to the now negative crosstalk spike 84 that is supplied by the B–Y detector as indicated by the graph 85. Negative and positive spikes 122 and 126 of the graph 118 again appear at the junction 120 and as before only the negative spikes are passed to the junction 108. The negative spike 122 cancels the now positive crosstalk spike 82. Thus during the second field the positive crosstalk spikes 82 appearing at the leading edge of the red bar are reduced or cancelled and the negative crosstalk spikes 84 appearing at the trailing edge of the red bar accentuated. During both fields the B–Y signal is combined with a +Y signal in the adder 44 that is similar to the adder 40 so as to produce a —B signal.

Hence the circuit of Figure 5 always cancels any positive crosstalk spikes and accentuates the negative crosstalk spikes, irrespective of whether these spikes occur at the leading edge or the trailing edge of the red bars. (A reversal in the polarities of both crystals would cause the circuit to eliminate negative spikes and accentuate positive ones.)

Figure 6 illustrates a circuit that operates to cancel or reduce both positive and negative crosstalk spikes in the B–Y channel. The output of the R–Y channel is differentiated by a condenser 128 and resistors 130 and 132 and the differentiated wave is applied to the adder 46 via an inverting gated amplifier 134. The R–Y signal is also differentiated by a condenser 136 and resistors 138 and 140 and is coupled to the adder 46 via a non-inverting gated amplifier 142. Rectangular waves 144 and 146 of frame frequency and 180° apart are derived from the usual synchronizing signals by means known to those skilled in the art. The wave 144 is applied at the junction of the resistors 130 and 132 and may for example operate to cut off the phase inverting amplifier 134 during the first field. The wave 146 is applied to the junction of the resistors 138 and 140 and operates to cut off the amplifier 142 during a second field. Hence, during the first field the crosstalk elimination spikes 88 and 90 appear at the cathode of the non-phase inverting amplifier 142 with a phase such as indicated in the graphs 86 and 92. During this field the crosstalk spikes on the B–Y signal have opposite relative amplitudes as indicated by the graph 80 so that the two sets of spikes cancel in the adder 46. In this particular circuit the adder 46 is comprised of two cathode coupled amplifiers. The crosstalk eliminator spikes are applied to the grid of one amplifier and the B–Y signal with its crosstalk spikes is fed to the grid of the other amplifier. During the second field the polarities of the respective crosstalk spikes in the B–Y signal reverse as illustrated by the graph 84. However, the crosstalk elimination spikes 88 and 90 reach the cathode of the phase inverting amplifier 142 via the amplifier 134 and are therefore inverted in phase so that again their addition to the B–Y signal in the adder 46 cancels the crosstalk spikes in the B–Y signal. In other words, as the color phase alternation causes the crosstalk spikes to reverse in polarity the crosstalk elimination spikes are reversed in polarity so that the addition of the two sets of spikes produces a cancelation. If a subtractor were used instead of an adder, the polarities of the keying or gating waves 144 and 146 could be interchanged.

Other circuit designs could be used but the essential function is to obtain a derivative of the output of one detector and combine it with the output of the other detector with such polarity as to cancel the crosstalk. If color phase alternation is used, the derivative must be periodically inverted in phase if it is to cancel (both polarities of) the crosstalk since the latter is periodically inverted in phase.

If the color phase alternation is not used, and if the relative phases of the R–Y and B–Y signals were as in field 1, the phase inverting amplifier 134 could be omitted as the crosstalk correction spikes corresponding to the crosstalk spikes have opposite polarities and the addition of these produces a cancellation. If the relative phases of the R–Y and the B–Y signals were as indicated for field 2, the amplifier 142 could be eliminated. In either case, no keying waves are necessary.

What is claimed is:

1. In a color television receiver that derives at least part of the color information from a carrier that is phase modulated in accordance with hue and amplitude modulated in accordance with saturation and wherein the carrier is located on a sloping portion of the frequency response characteristic of the receiver, apparatus for recovering at least two color signals from the color carrier with reduced crosstalk comprising in combination a source of a first set of alternating current waves of a predetermined phase and having a frequency equal to that of the color carrier, means for heterodyning the alternating current waves with the color carrier so as to derive a first color signal, a source of a second set of alternating current waves having a different phase than the first set, means for heterodyning the color carrier with the second set of alternating current waves so as to derive a second color signal, means for deriving a crosstalk elimination voltage proportional to the frequency of the second color signal, and means for combining the voltage thus derived with the first color signal.

2. In a color television receiver that derives at least part of the color information from a carrier that is phase modulated in accordance with hue and amplitude modulated in accordance with color saturation wherein color phase alternation is employed, wherein the carrier is located on a sloping portion of the frequency response characteristic of the receiver and wherein at least two color signals are respectively derived by first and second means for heterodyning the received carrier with alternating current waves of carrier frequency having different predetermined phases, a crosstalk reduction circuit comprising in combination a first differentiation circuit coupled to the output of a first of said heterodyning means, an adder coupled to the output of a second heterodyning means, a first unilateral conducting device coupled between said first differentiation circuit and said adder, a phase inverter coupled to the output of said first heterodyning means, a second differentiation circuit coupled to the output of said phase inverter, and a second unilateral conducting circuit coupled between the output of said phase inverter and said adder, the polarity of the unilateral conducting devices with respect to the adder being the same.

3. In a color television receiver that derives at least part of the color information from a carrier that is phase modulated in accordance with hue and amplitude modulated in accordance with color saturation, wherein color phase alternation is employed, wherein the carrier is located on a sloping portion of the frequency response characteristic of the receiver and wherein at least two color signals are respectively derived by first and second means for heterodyning the received carrier with alternating current waves of carrier frequency having different predetermined phases, a crosstalk reduction circuit comprising in combination a first differentiation circuit coupled to the output of said first heterodyning means, an adder coupled to the output of said second heterodyning means, a second differentiation circuit coupled to the output of said first heterodyning means, a first gating circuit coupled between said second differentation circuit and said adder, a phase inverting gate circuit coupled between said first differentiation circuit and said adder, and means for alternately changing the conduction condition of said first gating circuit and said second gating circuit in such manner that one gating circuit is conducting when the other is non-conducting.

4. In a color television receiver that derives at least part of the color information from a carrier that is phase modulated in accordance with hue and amplitude modulated in accordance with color saturation wherein color phase alternation is employed, wherein the carrier is located on a sloping portion of the frequency response characteristic of the receiver and wherein at least two color signals are respectively derived by first and second means for heterodyning the received carrier with alternating current waves of carrier frequency having different predetermined phase, a crosstalk reduction circuit comprising in combination means for differentiating the output of said first heterodyning means, means for deriving the differentiated output of said first heterodyning means with an inverted phase, and means for adding the differentiated output of the first heterodyning means to the output of the second heterodyning means during one field and means for adding the phase inverted differentiated output of the first heterodyning means to the output of the second heterodyning means during a succeeding field.

5. In a color television system including a source of carrier frequency waves modulated in phase in accordance with hue and modulated in amplitude in accordance with saturation, apparatus comprising the combination of a source of waves of carrier frequency of a first predetermined phase, an additional source of waves of carrier frequency of a second predetermined phase, means for heterodyning the waves of carrier frequency of said first predetermined phase with said phase and amplitude modulated color carrier, additional means for heterodyning the waves of carrier frequency of said second predetermined phase with the phase and amplitude modulated color carrier, means for differentiating the output of one of said heterodyning means, and an adder coupled to the outputs of said differentiating means and the other of said heterodyning means.

6. In a color television receiver adapted to receive and recover a color subcarrier, said color subcarrier comprising respective components in phase quadrature, each of said components being representative of a respectively different color aspect of an image, apparatus comprising the combination of means for providing waves of the subcarrier frequency and having given phase relationships to one of said color subcarrier components, means for heterodyning said recovered color subcarrier with subcarrier frequency waves of one of said given phase relationships, additional means for heterodyning said color subcarrier with other subcarrier frequency waves in phase quadrature wtih said waves of said one given phase relationship, means for differentiating the output of one of said heterodyning means, and means for combining the output of said differentiating means with the output of the other of said heterodyning means.

References Cited in the file of this patent

UNITED STATES PATENTS

| | | |
|---|---|---|
| 2,192,275 | Royer | Mar. 5, 1940 |
| 2,468,030 | Bullock | Apr. 26, 1949 |
| 2,482,549 | Killiman et al. | Sept. 20, 1949 |